July 3, 1951 C. H. FAY 2,559,245
SYSTEM FOR AMPLIFYING SMALL DIRECT CURRENTS
Filed June 14, 1949 3 Sheets-Sheet 1

Inventor:
Charles H. Fay
By
His Attorney

July 3, 1951  C. H. FAY  2,559,245
SYSTEM FOR AMPLIFYING SMALL DIRECT CURRENTS
Filed June 14, 1949  3 Sheets-Sheet 3

Inventor: Charles H. Fay
By [signature]
His Attorney

Patented July 3, 1951

2,559,245

UNITED STATES PATENT OFFICE 2,559,245

SYSTEM FOR AMPLIFYING SMALL DIRECT CURRENTS

Charles H. Fay, Houston, Tex., assignor to Shell Development Company, San Francisco, Calif., a corporation of Delaware Application June 14, 1949, Serial No. 99,051

9 Claims. (Cl. 179—171)

This invention pertains to the amplification of electric currents and relates more particularly to an apparatus for amplifying small direct currents and voltages.

Except for difficulties with drift, most of the conventional electronic D. C. amplifiers are reasonably satisfactory for use with high impedance sources producing voltages of the order of a few tens of millivolts; they are, however, of little use in connection with low impedance sources such as thermocouples, certain types of strain gages, etc.

It is therefore an object of this invention to provide an amplification system substantially free from drift and capable of amplifying the output of low-impedance sources.

It is also an object of this invention to provide an amplification system capable of amplifying very small direct currents and voltages to a degree sufficient to permit their measurement by means of indicating or recording instruments of relatively low sensitivity, such as milliammeters, millivoltmeters, etc., or their use for actuating such control devices as thermostats, relays, small motors, etc.

These and other objects of this invention will be understood from the following description, taken with reference to the attached drawings, wherein.

Figure 1:
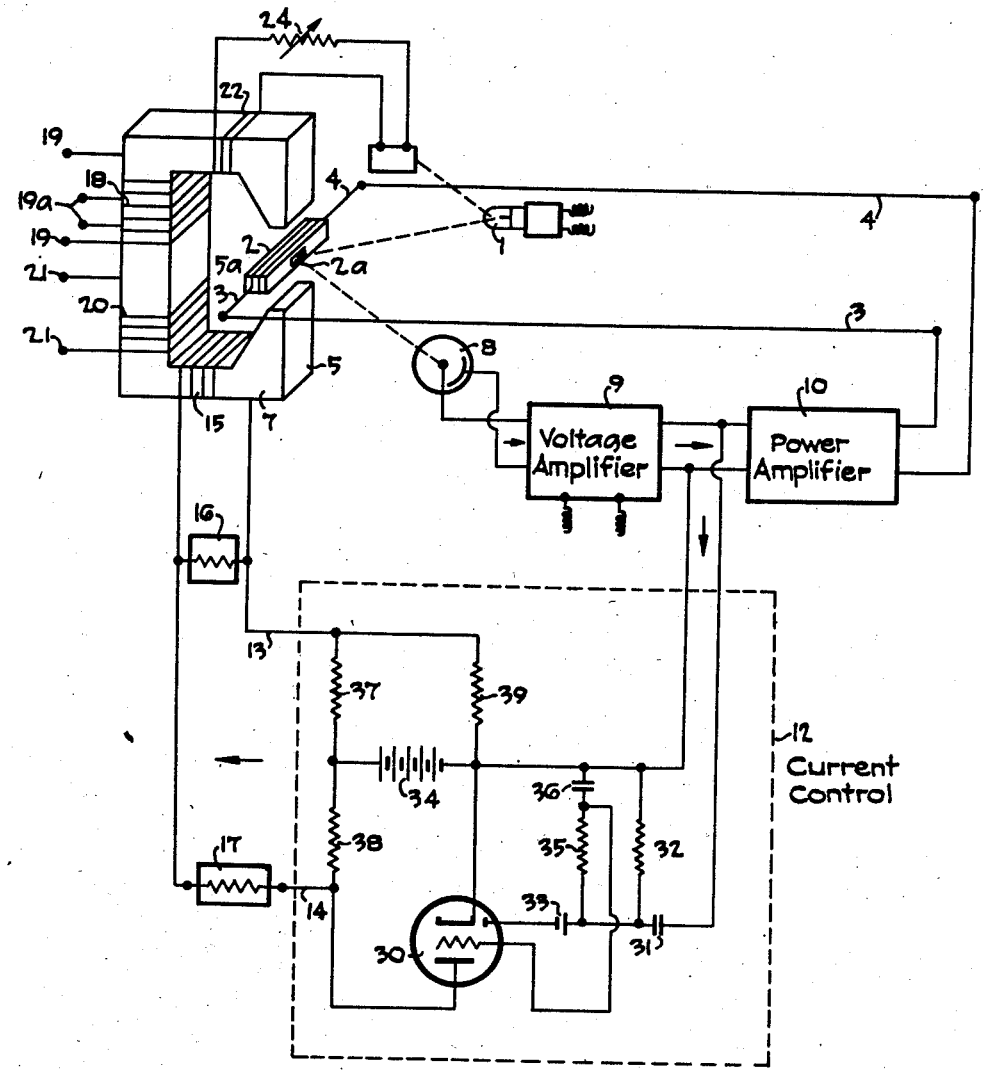
Fig. 1 is a diagram illustrating the general circuit arrangement of the present system.

Referring to Fig. 1, a source of light 1 such, for example, as a line-filament lamp, energized from any suitable supply, not shown, directs a beam of light and illuminates a mirror 2a attached to a vibrator coil 2, which is of the type of taut suspension oscillograph galvanometer coils. Wires 3 and 4 serve to conduct electric current to the coil and at the same time to mount or support said coil for oscillation about an axis perpendicular to the magnetic lines of force in the air gap 5a of a preferably laminated core 5, made of a suitable soft magnetic material.

Rays from source 1 are reflected by the oscillating mirror 2a and directed thereby to a photocell 8, which is thus made to produce a varying voltage proportional to the amplitude of vibration of the coil 2. This varying or alternating voltage is passed through voltage and power amplifier stages 9 and 10, and is applied to the oscillating coil 2, through wires 3 and 4.

A portion of the amplified alternating current or voltage produced by photo-cell 8 is passed through a control circuit 12, to be described hereinbelow, and are applied through leads 13 and 14 to a control coil or winding 15 on the core 5. Leads 13 and 14 may be provided with shunt and/or series loads or resistances 16 and 17, such as the devices it is desired to operate by means of the control current, or the measuring devices of the voltmeter or ammeter type by means of which it is desired to measure said current.

The core 5 carries an input coil or winding 18, preferably occupying the major part of the available winding space. The input winding 18 has terminals 19 which are connected to the source or device, e. g. a thermocouple, whose small output current it is desired to measure by means of the present system. The winding 18 should preferably match the impedance of the source. By splitting the input winding 18 into a plurality of windings, which may be for this purpose provided with auxiliary terminals 19a, a plurality of input impedances of any desirable value may be obtained by means of suitable series or parallel connections between said windings.

In order to increase the sensitivity of the present apparatus, it may be desirable to provide an additional winding 20 having terminals 21 connected to a source of high frequency alternating current, not shown, whereby hysteresis effects are substantially eliminated in the core 5.

In operation, the source whose D. C. output it is desired to measure is connected to the terminals 19 and energizes the coil 18, thus establishing a magnetic flux in the air gap of the core 5, in which the vibrator 2 starts oscillating.

The photocell 8 converts the oscillation of the vibrator into a voltage, as described above, which voltage is amplified and suitably shifted in phase by the amplifier stages, and is then fed to the vibrator coil to drive said coil at its mechanical resonance frequency by the reaction of said current with the magnetic field of the air gap, in the manner of a feedback oscillator.

At the same time, the current control circuit 12 applies to the control winding 15 a current tending to oppose the effect of the current in the input winding 18. The current in the control winding 15 automatically reduces the flux in the air gap of the core to the minimum density value necessary for barely maintaining the vibrator coil 2 in oscillation, this value of the amplified control current being a measure of the current in the input winding which it is desired to determine.

The current control 12 comprises thermionic diode and triode or pentode means, which may be conveniently combined in a single diode-triode tube as shown at 30. The diode section of tube 30 is coupled to the voltage amplifier 9 through a condenser 31, and has a load resistance 32, a biasing battery 33 being provided if desired to give a delay effect. The triode section is provided with a plate voltage supply 34. The negative D. C. voltage created by the rectification of the input to the diode section is applied to the triode grid of tube 30 through a ripple filter comprising a resistor 35 and a condenser 36, which filter reduces the A. C. component of said diode voltage to a negligible value. The negative voltage thus applied to the grid of tube 30 serves to reduce the plate current of said tube, which is the current supplied to the control winding 15, until the total field in the gap of core 5, in which the vibrator 2 oscillates, is automatically reduced to a small value, and the system oscillates at the amplitude required to supply the required signal to the diode section of tube 30.

Since it is generally desirable that control section 12 should be capable of providing an output of either sign, resistors 37, 38 and 39 may be connected so as to form the three arms of a bridge of which the triode 30 may be considered to form the fourth arm, the bridge being energized by the battery 34. It will be seen that by a proper selection of circuit constants, output currents of either sign may be caused to flow in leads 13 and 14.

The output current will in general not be zero when the input current is zero, because a small but not zero total field is required for maintenance of oscillation. Stray magnetic fields, where not eliminated by suitable magnetic shielding of the device, may further affect what may be termed a zero shift. Where such a shift cannot be allowed, permanent magnets may be arranged to contribute to the field in the gap and adjusted until zero output is obtained for zero input, in a manner well known in the art.

Figure 2:
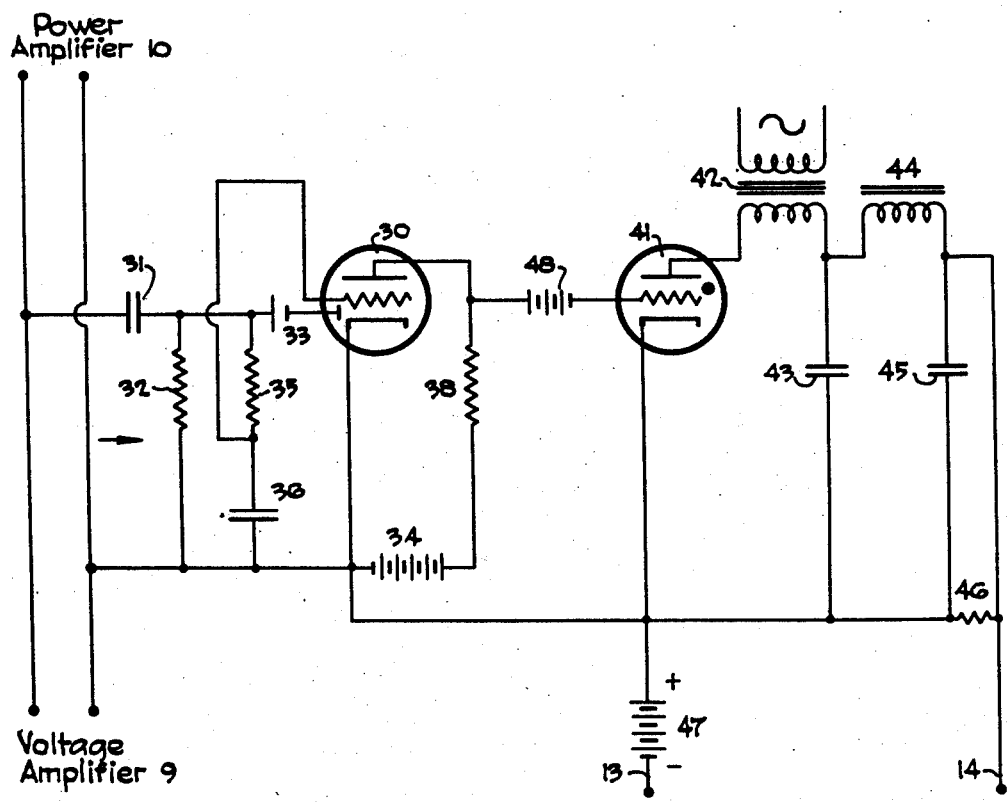
Fig. 2 is an alternative form of the current control circuit 12 of Fig. 1.

When large output currents are required, for example to operate motors or other electrical machinery, it may be advantageous to use a current control circuit such as shown in Fig. 2, which comprises, besides the elements already described, a thyratron tube 41, whose normal grid bias as determined by a battery 48, is varied by the output of tube 30. Thyratron 41 is provided with an alternating plate supply from any desired source, as indicated at 42, the A. C. cathode return being principally through a condenser 43, and the cathode D. C. return being through a low pass filter comprising a choke 44 and a condenser 45, through resistor 46, and, in parallel therewith, through the output load and battery 47.

If the values of the circuit constants are properly chosen, the thyratron 41 does not fire at zero input signal, and battery 47 supplies current to the load through resistor 46. For an increasing input signal, however, the plate of tube 30, and consequently the grid of thyratron 41, becomes more positive, so that the thyratron fires earlier in the alternating current half-cycle during which the plate is positive, thereby drawing an average current which opposes and ultimately reverses the current in the load. It is to be noted that the linearity of the control circuit, that is, the linearity of relation between input signal and output current is of little or no consequence so long as the desired range of output current is obtained over a range of input voltage for which the voltage and power amplifiers are linear. Where rapid response is desired, it is advantageous to employ a control circuit covering the desired range with a small variation of input signal.

Changes in light intensity of the light source 1, which cause changes in the total magnetic field and consequently produce some drift effects, may be compensated for, if desired, by providing a further auxiliary winding 22, energized by the output current of a generating type photocell 23, which is responsive to the same source of light 1, through a variable resistance 24, this compensating circuit being adjusted so that any change of the current therein due to change in illumination intensity tends to neutralize the change in the total flux in the core and air gap over a reasonable range.

As should be clear from the above description, when a small direct current, for example, from a thermocouple, is fed to the input winding 18, thus setting up a corresponding magnetic field in the core, the present system will operate to produce in the control coil 15 a current tending to set up in the core a magnetic field equal and opposite to that due to the current in the input winding, that is, a current which is proportional to the input current.

If the input winding 18 has N times the number of turns of the control winding 15 it will be seen that the control current will have approximately N times the intensity of the input current. If the control winding 15 is shunted by a shunt load 16, such as a meter, a small motor, etc., having 1/M times the resistance of the control winding 15, the current in the shunt load will be M times that of the control coil or M.N times the input current; furthermore, the current in the series load 17, which may be of a type similar to the load 16 will be $N(M+1)$ times the input current. The present system thus serves as an amplifier over the output current range which can be supplied by the current control 12 without amplifier overloading.

An advantage of the embodiment of the invention shown in Fig. 1 is that the input and output circuits can be isolated. Where isolation is not required, the embodiment shown in Fig. 3 has the advantage, important for some applications, of drawing very little current from the apparatus connected to the input, being indeed a so-called infinite input impedance device, if the system is adjusted by means of permanent magnets as mentioned hereinabove to give zero output current when the source is disconnected and the input shorted.

Figure 3:
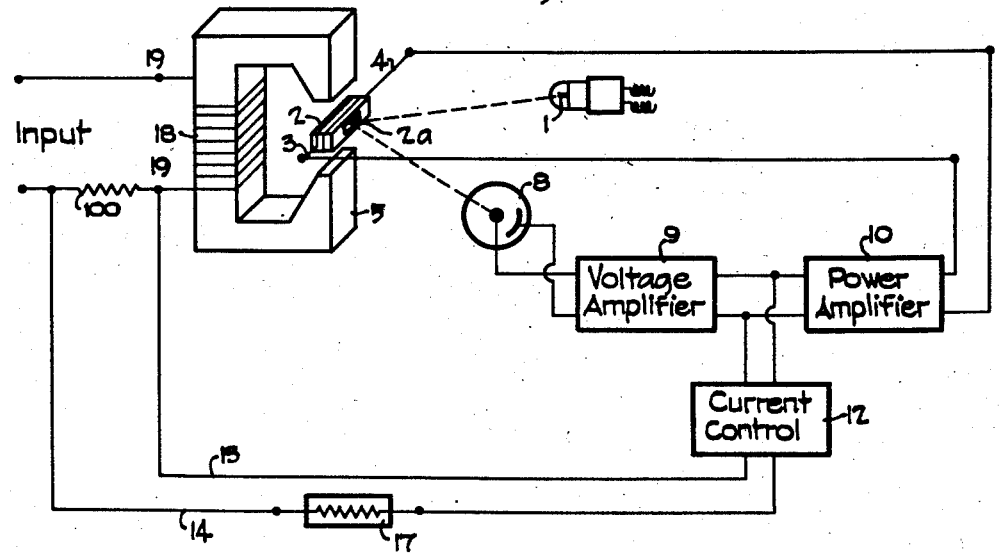

The circuit of Fig. 3 is essentially similar to that of Fig. 1. various refinements such as windings 20 and 22 being omitted for the sake of simplicity. Instead, however, of the leads 13 and 14 being connected across a resistance 16 and a winding 15 in parallel, these leads are connected across a resistor 100 connected to the terminal 19 in the input circuit. It will be readily understood that under these conditions the control operates to maintain the current in coil 18 at zero, so that no steady current is drawn from the source or input. The device may be considered as a self-balancing potentiometer, in that it automatically creates across resistor 100 a voltage drop equal and opposite to the input voltage. If the resistance of load resistor 17 is N times that of the resistor 100, the output voltage across said load will be N times the input voltage.

Figure 4:
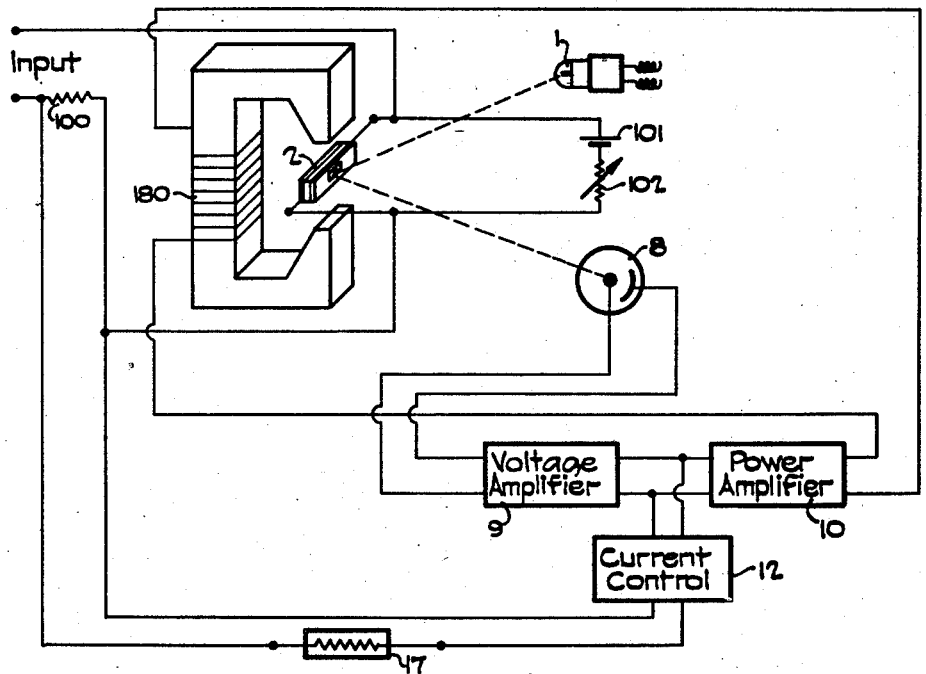
Figs. 3 and 4 are further embodiments of the invention.

In order to operate at their full sensitivity and accuracy, the embodiments described above should preferably be provided with careful magnetic shielding to eliminate the effects of varying external magnetic fields on their zero shift, which may sometimes prove to be a disadvantage in mobile applications. It has now been found that since the wanted torque actuating the vibrator coil 2 in the embodiment of Fig. 3 is proportional to the product of the currents in the two coils, it is possible to interchange the connections between the two coils, as shown in Fig. 4, so that the power amplifier 10 feeds the coil 180, while the vibrator coil 2 carries the D. C. input current. This modification has the advantage of making the device insensitive to external magnetic fields. The device operates to maintain the vibrator coil current at a small constant value which is however not quite zero. If zero input current is required, a battery 101 and a variable resistor may be connected across the vibrator coil 2 to supply thereto the current required for maintaining the oscillation.

I claim as my invention:

1. A system for amplifying small direct currents and potentials producing said currents comprising first coil means for setting up a magnetic field proportional to the current flowing therein, second coil means pivotally mounted for continuous cyclic oscillation in said magnetic field, means for supplying a small direct current to one of said coil means, a light source, a photoelectric element, optical means carried by said oscillating coil for cyclically varying the illumination of the photoelectric element by the light source, amplifier means energized by the alternating current output of the photoelectric element, means for passing a portion of said amplified alternating current output through the other coil means, a control circuit comprising rectifier means connected to the alternating current output of said amplifier means for rectifying another portion thereof, means for applying said rectified portion to oppose the effects of said small direct current, and means in said control circuit for adjusting the value of said rectified current to such a value that the reaction of the current flowing in said pivoted coil means with said magnetic field is just sufficiently strong to maintain the pivoted coil in continuous cyclic oscillation.

2. A system for amplifying a small direct current, comprising a magnetic core having an air gap, coil means wound on said core, means for passing said small direct current through at least a portion of said coil means, coil means pivoted for oscillation in said air gap, a light source, a photoelectric element, optical means carried by the pivoted coil means for varying the illumination of the photoelectric element by the light source, amplifier means energized by the output of the photoelectric element, means for passing a portion of said amplified output through said pivoted coil means, a control circuit connected to the output of said amplifier means comprising means for rectifying a portion of the output of said amplifier means, means for applying said rectified portion to the coil means wound on the core to oppose the magnetic field set therein by said small direct current, and means in the control circuit for adjusting said rectified current to such a value that the reaction of the alternating current flowing in said pivoted coil means with the magnetic field in the gap of the core is just sufficiently strong to maintain the pivoted coil in oscillation.

3. A system for amplifying a small direct current comprising first coil means carrying said current to set up a magnetic field proportional thereto, pivoted coil means mounted for continuous cyclic oscillation in said field, a light source, a photoelectric element, optical means carried by said pivoted coil means for cyclically varying the illumination of the photoelectric element by the light source, amplifier means energized by the alternating current output of the photoelectric element, means for passing a portion of said amplified alternating current output through said pivoted coil means, a control circuit comprising means for rectifying a portion of said amplified alternating current output, second coil means disposed in the proximity of said first coil means, means for passing through said second coil means the rectified current, and means in said control circuit for adjusting the current passing through said second coil means to such value that the resultant field of said first and second coil means is just sufficiently strong to maintain the pivoted coil in continuous cyclic oscillation by reaction with the alternating current flowing in said coil.

4. A system for amplifying a small direct current, comprising a magnetic core having an air gap, an input coil wound on said core adapted to carry said small direct current, a coil pivoted for oscillation in said air gap, a light source, a photoelectric element, optical means carried by the pivoted coil for varying the illumination of the photoelectric element by the light source, amplifier means energized by the current of the photoelectric element, means connecting the output of said amplifier means to the pivoted coil, a control wound on said core, a control circuit connecting the output of said amplifier means to the control coil, and means comprising rectifier means in said control circuit for supplying to the control coil a direct current of the intensity and polarity required for reducing the resultant field in the air gap due to the input and control coil currents to a value just sufficient for barely maintaining the pivoted coil in continuous oscillation by the reaction of the alternating current supplied thereto with said field in the air gap.

5. The device of claim 4 having an auxiliary coil wound on the core, and a source of high frequency alternating current connected to said coil to eliminate hysteresis effects in the core.

6. The device of claim 4 having an auxiliary coil wound on the core, a second photoelectric element illuminated by said source of light, and circuit means comprising variable resistance means connecting said auxiliary coil to the output of said second photoelectric element, said auxiliary coil and circuit means being arranged so that magnetic effects due to a variation of current in the auxiliary coil tend to neutralize those due to a simultaneous variation of current in the control coil, said current variations being produced by changes in the intensity of the light source.

7. A system for amplifying a small direct potential, comprising a magnetic core having an air gap, input coil means wound on said core adapted to carry a small direct current produced by said potential, coil means pivoted for oscillation in said air gap, a light source, a photoelectric element, optical means carried by the pivoted coil means for varying the illumination of the photoelectric element by the light source, amplifier means energized by the output of the photoelectric element, means for passing a portion of said amplified output through said pivoted coil means, a control circuit connected to said amplifier means comprising means for rectifying a portion of said amplified output, a resistor in circuit with the input coil means wound on the core, means connecting the rectified output of the control circuit across said resistor in opposition to said small direct potential, and means in the control circuit for adjusting said rectified output to such a value that the reaction of the alternating current flowing in said pivoted coil means with the magnetic field in the gap of the core is just sufficiently strong to maintain the pivoted coil in oscillation.

8. A system for amplifying a small direct potential, comprising a magnetic core having an air gap, coil means pivoted for oscillation in said air gap, input circuit means comprising a resistor for passing a small direct current through said pivoted coil, a light source, a photoelectric element, optical means carried by the pivoted coil for varying the illumination of the photoelectric element by the light source, amplifier means energized by the output of the photoelectric element, means comprising a winding on said core connected to the output of the amplifier means for producing an alternating magnetic field in said core, a control circuit comprising rectifier means connected to the output of the amplifier means, means connecting the rectified output of the control circuit across the resistor in the input circuit, and means in the control circuit for adjusting said rectified output to such a value that the reaction of the direct current flowing in said pivoted coil means with the alternating magnetic field in the gap of the core is just sufficiently strong to maintain the pivoted coil in oscillation.

9. A system for amplifying small direct currents comprising first coil means arranged for setting up a magnetic field proportional to the current flowing therein, second coil means, suspension means pivotally mounting said second coil means for continuous oscillation at the mechanical resonance frequency of said coil means in said magnetic field, means for supplying a small direct current to one of said coil means, a light source, a photoelectric element, optical means carried by said continuously oscillating coil for varying the illumination of the photoelectric element by the light source, whereby an alternating current proportional to said cyclically varying illumination is produced by said photoelectric element, amplifier means energized by said alternating current, means for passing a portion of said amplified alternating current through said other coil means, a control circuit comprising rectifier means connected to the output of said amplifier means for rectifying another portion of said amplified alternating current, means for applying the rectified portion of said current in opposition to the small direct current under measurement, and means in said control circuit for adjusting the value of said rectified current to a value such that the reaction of the current flowing in said pivoted coil means with the magnetic field produced by the other coil is just sufficient to maintain the pivoted coil in continuous oscillation at its mechanical resonance frequency.

CHARLES H. FAY.

REFERENCES CITED

The following references are of record in the file of this patent:

UNITED STATES PATENTS

| Number | Name | Date |
|---|---|---|
| 2,209,717 | Fairchild et al. | July 30, 1940 |
| 2,216,301 | Sparrow | Oct. 1, 1940 |
| 2,262,790 | Bean et al. | Nov. 18, 1941 |
| 2,267,681 | Fairchild | Dec. 23, 1941 |
| 2,329,423 | Steghart | Sept. 14, 1943 |